२,757,071
Patented July 31, 1956

2,757,071

MANGANESE DIOXIDE PRODUCT

Jay Y. Welsh and Russell A. Holmes, Brainard, Minn., assignors to Manganese Chemicals Corporation, Minneapolis, Minn., a corporation of Minnesota No Drawing. Application May 17, 1954,
Serial No. 430,434

4 Claims. (Cl. 23—145)

This invention relates to the production of a manganese dioxide product suitable for use as depolarizer in a dry cell battery of the La Clanche type, and is particularly concerned with a treatment of an oxidized manganese carbonate product derived by precipitation from a solution af an ammonio complex of manganese and subsequent oxidation, for the purpose of changing the crystal structure thereof, and/or increasing the manganese dioxide content thereof, to the end that the depolarizing properties of said oxidized manganese carbonate product are improved. The term "oxidized manganese product" is here intended to refer to such compositions as contain from about 50% to about 85% of manganese dioxide.

According to the present invention, oxidized manganese carbonate obtained by heating the aforesaid precipitated manganese carbonate for some hours, in air, at an elevated temperature substantially above the boiling point of water, e. g. a temperature of the order of 250°–300° C., is treated for a period of several hours with an aqueous electrolyte (this term being more specifically defined hereinbelow) at an elevated temperature below the boiling point of the electrolyte, whereafter the electrolyte is separated from the oxidized carbonate as by filtration and the solid product is dried and is heated for some hours at a temperature of the order of 175°–210° C. and thereupon cooled (or permitted to cool).

While improvement by leaching is or may be involved in the procedure, the process is distinguished from mere leaching by the fact that the desired change in crystal structure is contingent upon the final heat-treatment of the electrolyte-treated oxidized carbonate.

The expression "aqueous electrolyte" is intended to include aqueous solutions of inorganic salts such as ammonium chloride and zinc chloride, dilute aqueous solutions of inorganic acids such as sulphuric acid and hydrochloric acid, and even ordinary electrically conductive tap water.

The invention will now be described in greater particularity with reference to the following specific examples.

Example 1

The starting material was a manganese dioxide material analyzing 79.1% $MnO_2$ and having a modified rho, or gamma-rho, crystal structure. This material had been produced by heating in air a manganese carbonate precipitate from a solution of an ammonio-complex of manganese. The material was steeped in a 5% aqueous solution of ammonium chloride at about 90° C. for 18 hours, and then filtered and dried at 110° C. It was found that an intermediate hydrate had been formed with some lowering of the $MnO_2$ analysis. The dried material was then heated for some time at about 210° C. and cooled. Analysis of the final product showed a content of 90.2% $MnO_2$ and a pyrolusite crystal structure. The depolarizing properties of the final product were materially improved over those of the initial oxidized manganese carbonate.

Example 2

The starting material was an oxidized manganese carbonate material analyizing 73.6% $MnO_2$ and having a modified rho or gamma-rho crystal structure. The material was treated for 24 hours, at about 90° C., with a 20% aqueous solution of ammonium chloride, filtered, dried at 110° C., and heated in air for some hours at about 205° C. The resulting product, which analyzed 83.4% $MnO_2$ had the gamma crystal structure which is normally associated with electrolyte manganese dioxide and demonstrated improved depolarizing properties.

Example 3

A manganese dioxide product produced as described in Example 1, analyzing 68.8% $MnO_2$ and having a modified rho or gamma-rho crystal structure was treated for about 18 hours at about 90° C. with aqueous hydrochloric acid of 5% strength, filtered, dried at 110° C. and heated in air at about 210° C. for some hours. The resulting product analyzed 90.5% $MnO_2$, and was found to have a pyrolusite crystal structure.

The above results are to be contrasted with the application of the heretofore proposed leaching of manganese oxide products with dilute aqueous solutions of inorganic acids. Thus, an oxidized manganese carbonate when treated for about 24 hours, at about 90° C., with dilute sulphuric acid of 10% strength, filtered and merely dried at 110° C., showed a substantial improvement as to manganese dioxide analysis but no change as to crystal structure.

Example 4

The conditions of Example 2 were repeated, with the exception that the treating agent was a solution of zinc chloride. The heat-treated product showed an $MnO_2$ content materially higher than the starting material and a gamma crystal structure.

Example 5

In a repetition of Example 1, in which ordinary electrically conductive tap water was substituted for the aqueous solution of ammonium chloride, the other conditions being the same, the $MnO_2$ content of the oxidized carbonate material was increased to 84.3%.

We claim:

1. Process of changing the crystal structure of an oxidized manganese carbonate product containing from about 70% to about 85% of manganese dioxide and initially exhibiting a modified rho or gamma-rho crystal structure, which comprises treating the oxidized manganese carbonate for at least twelve hours with an aqueous electrolyte of the group consisting of aqueous solutions of inorganic salts, dilute aqueous solutions of inorganic acids and electrically conductive tap water at an elevated temperature of the order of 90° C. being below the boiling point of said electrolyte, separating electrolyte from the oxidized manganese carbonate product, drying the latter, and heating it for some time at an elevated temperature of the order of 175°–210° C., whereby to impart to said oxidized carbonate product a crystal structure normally associated with electrolytic manganese dioxide.

2. Process defined in claim 1, in which the treatment with aqueous electrolyte is conducted for from 12 to 48 hours and at a temperature of about 90° C.

3. Process as defined in claim 2, in which the treated and oxidized carbonate product is heated at a temperature of about 210° C.

4. Process of converting to a battery grade manganese dioxide product a manganese carbonate obtained by precipitating the same from an aqueous solution of a $CO_2$-containing ammonio complex of manganese, which consists essentially in the sequential steps of (1) heating the precipitated manganese carbonate in air at a temperature within the range 250–300° C., and for a period of time sufficient to convert at least 50% of the carbonate to manganese dioxide; (2) treating the resulting partially oxidized material with an aqueous electrolyte of the group consisting of aqueous solutions of inorganic salts, dilute aqueous solutions of inorganic acids and electrically conductive tap water for from about 12 to about 48 hours, at an elevated temperature of the order of 90° C., being below the boiling point of the electrolyte; (3) separating the so-treated material from the electrolyte and drying it; (4) and heating the material, in air, at a temperature of from about 175° to about 210° C.

References Cited in the file of this patent

UNITED STATES PATENTS

| | | |
|---|---|---|
| 1,275,666 | Ellis et al. | Aug. 13, 1918 |
| 1,343,390 | Chapin | June 15, 1920 |
| 1,343,585 | Ruhoff | June 15, 1920 |
| 1,448,110 | De Olaneta | Mar. 13, 1923 |
| 2,606,466 | Fox | Aug. 26, 1952 |

FOREIGN PATENTS

| | | |
|---|---|---|
| 551,471 | Great Britain | Feb. 24, 1943 |

OTHER REFERENCES

Morozov et al.: "The Gamma Modification of Manganese Dioxide," Chemical Abstracts, 1950, column 65(i).